Patented May 11, 1937

2,079,951

UNITED STATES PATENT OFFICE 2,079,951

BINDING AGENT FOR PAINTS, LACQUERS, AND VARNISHES

Jacobus Rinse, Overveen, Netherlands, assignor to Naamlooze Vennootschap tot voortzetting der zaken van Pieter Schoen & Zoon, Zaandam, Netherlands, a corporation of the Netherlands No Drawing. Application May 10, 1935, Serial No. 20,890. In the Netherlands May 15, 1934

2 Claims. (Cl. 134—26)

It has been suggested to improve the properties of oil paints by adding separately chlorinated rubber and phthalate resin. Phthalate resins without any further additions have also been used as binding agents for paints. All these paints, however, possess disadvantages which hamper their use in actual practice.

The oil-chlorinated rubber mixtures remain sticky for a long time, the oil-phthalate resin paints remain soft for quite a while, and the pure phthalate resin paints soon lose their gloss, whereas the ordinary oil paints cannot be considered sufficiently lasting.

I have now found that by mixing chlorinated rubber, phthalate resin and one or more raw or polymerized drying oils a paint binding agent may be obtained which is free from the disadvantages connected with the combinations of only two components, and which dries very quickly to a coat of paint which does not stick and, moreover, has great lasting properties while exposed to the weather, far surpassing those of the oil and phthalate resin paints. Mixtures of phthalate resin withstand oil but often cannot be homogeneously prepared and do not produce clear coatings of lacquer. The same is the case with mixtures of chlorinated rubber and some phthalate resins. By the addition of the third component in the present case chlorinated rubber and drying oil respectively, I obtain homogeneous solutions drying smoothly and clearly. The mixing of the drying oil with the phthalate resin may be effected by heating, if this should be desired.

For the preparation of a paint the binding agent according to my invention may either be added as such to the pigment or to the oil paint, or the pigment-oil-paste may first be mixed with the chlorinated rubber solution or with the liquid phthalate resin respectively, after which the phthalate resin or the chlorinated rubber solution, respectively, is added to the mixture, or else the pigment is first ground into the phthalate resin solution or into the chlorinated rubber solution, after which the paste thus obtained is mixed with the other two constituents of the binding agent.

Examples

I. Four parts by weight of a solution of one part by weight of chlorinated rubber in three parts by weight of xylene is mixed with one part by weight of liquid phthalate resin and one part by weight of stand oil.

II. Three parts by weight of a solution of one part by weight of chlorinated rubber in two parts by weight of xylene is mixed with three parts by weight of a solution of two parts by weight of a viscous phthalate resin in one part by weight of turpentine. For the preparation of a paint six parts by weight of the solution described above are added to two parts by weight of a paste comprising one part by weight of chromate green and one part by weight of raw linseed oil.

III. For the preparation of a paint one part by weight of liquid phthalate resin is mixed with three parts by weight of a paste comprising two parts by weight of chromate yellow and one part by weight of stand oil, four parts by weight of the mixture thus obtained being carefully added to one part by weight of a solution of one part by weight of chlorinated rubber in three parts by weight of xylene.

IV. One part by weight of phthalate resin is heated with one part by weight of linseed oil until a homogeneous mass has been obtained. Two parts by weight of this mass are mixed with two parts by weight of a 1:1 solution of chlorinated rubber in benzene. A siccative and a thinning out agent may be added to the finished paints or lacquers, if this should be desired.

I claim:

1. A binding agent for paints, lacquers and varnishes, consisting of a mixture of raw drying oil, phthalate resin and chlorinated rubber, dissolved in a solvent adapted to dissolve all three constituents, the chlorinated rubber being in an amount up to about 33 per cent of the total amount of the non-volatile constituents of the solution.

2. A binding agent for paints, lacquers and varnishes consisting of a mixture of polymerized drying oil, phthalate resin and chlorinated rubber, dissolved in a solvent adapted to dissolve all three constituents, the proportion of the chlorinated rubber being in an amount up to about 33 per cent of the total amount of the non-volatile constituents of the solution.

JACOBUS RINSE.